United States Patent [19]

Alafuzov et al.

[11] 4,018,429
[45] Apr. 19, 1977

[54] VERTICAL MULTIPLE-SPINDLE MACHINE

[76] Inventors: Jury Pavlovich Alafuzov, Bolshaya Cheremushkinskaya, 18, korpus 1, kv. 24; Artur Markovich Itin, Rostovskaya naberezhnaya, 1, kv. 47, both of Moscow, U.S.S.R.

[22] Filed: Apr. 29, 1976

[21] Appl. No.: 681,523

[52] U.S. Cl. .................................. 269/20; 269/57
[51] Int. Cl.² .......................................... B23Q 3/08
[58] Field of Search ........... 269/20, 24, 30, 55–57; 214/1 BB; 198/179; 91/392, 410; 51/216 ND

[56] References Cited
UNITED STATES PATENTS 3,658,315  4/1972  Boucherie .......................... 269/56

Primary Examiner—Harold D. Whitehead
Assistant Examiner—Robert C. Watson

[57] ABSTRACT

A vertical multiple-spindle machine relating to metal cutting machines. This machine comprises a stationary column on which is installed a rotary worktable mounting hydraulic clamping devices and provided with fluid inlet ducts. The stationary column is provided with passages for feeding fluid medium to he hydraulic clamping devices through said ducts, with the worktable in a fixed position. The column is also provided with a circular groove which is arranged to communicate with the fluid source and is formed so that it has portions curved about the outlets from the passages whereby said groove connects the worktable fluid ducts with the fluid source during the rotation of the worktable. This constructional arrangement makes it possible to materially reduce fluid leakage, thereby providing stability of the required fluid pressure in the clamping devices, improving the accuracy of the machine and decreasing waste of power.

1 Claim, 3 Drawing Figures

VERTICAL MULTIPLE-SPINDLE MACHINE

The present invention relates to metal-cutting machines and has particular reference to vertical multiple-spindle machines. It may be used to best advantage in large-series production, particularly in the automobile and tractor industries.

Known in the prior art are vertical multiple-spindle machines comprising a rotary worktable which mounts hydraulic clamping devices and is installed, by provision of a centre hole on a taper portion of a stationary column. In said machines, the rotary worktable has ducts for fluid medium to be force-fed to the clamping devices through a circular groove provided on the surface of the taper portion of the column and connected to the source of fluid medium.

The fluid medium is continuously fed under pressure to the clamping devices. As the fluid medium is fed under a pressure of 20–40 kgf/cm$^2$ through the circular groove (whose length equals the circumferential length of the column and measures 1800–3000 mm) considerable fluid leakage occurs through the clearance provided between the mating surfaces of the rotary worktable and stationary column in order to enable the worktable to rotate round the column. This fluid leakage results in drop of pressure in the worktable hydraulic clamping devices with consequent reduction of the claping force, the dimensional accuracy of the job being adversely affected. Furthermore, considerable drop of pressure may occur, resulting in an accident due to the workpiece breaking loose from the clamping device.

To compensate for the fluid leakage and to provide normal operating conditions for the hydraulic clamping devices, it is necessary to considerably increase the capacity of the fluid source and the power of its motor. These demands cause excessive need for electric power and increase in both cost and size of the electrical and hydraulic auxiliaries and control equipment involved.

Another disadvantage is that the heating of the fluid due to large amounts thereof being forced under pressure between the mating surfaces of the column and worktable results in increased heat rejection and consequent rise of the temperature of the column and worktable which form the locating surfaces of the machine. Obviously, the resultant thermal deformation of said components of the machine adversely affects the dimensional accuracy of the job. Also, the increased heating of the fluid medium has an ill effect on the functioning of the entire hydraulic system of the machine and in some cases it may result in seizure of the worktable on the column.

Also known in the art are vertical multiple spindle machines (see USSR Inventor's Certificate No. 174926) wherein, for the purpose of reducing fluid leakage between the mating surfaces of the worktable and column, the circular groove is formed interruptedly, the portions thereof being located symmetrically around the entire periphery of the column.

Each portion of said groove is rather long inasmuch as the length thereof has to be slightly greater than the distance between each two adjacent fluid ducts in the worktable so that all the ducts are connected with the fluid source during the rotation of the worktable.

Though this constructional arrangement contributes toward the reduction of fluid leakage between the mating surfaces of the worktable and column, the leakage of the fluid medium remains considerably large.

Besides, so called "oil spots," i.e. spaces filled with fluid medium at a pressure of 20–40 kgf/cm$^2$, become formed in the vicinity of said long portion of the groove, causing complicated deformations of the worktable and displacement thereof relative to the stationary column. As a result, the accuracy of the job is impaired and the efforts required to rotate the worktable round the column increase.

It is an object of the present invention to provide a vertical multiple-spindle machine employing such a manner of feeding fluid medium to the hydraulic clamping devices and having a circular groove so shaped that leakage of the fluid medium between the mating surfaces of the worktable and column will be minimized.

It is a further object of the present invention to exclude the "oil spots" and, consequently, ensure minimum deviation of worktable concentricity relative to the column, thereby enhancing the accuracy of the machine.

It is a still further object of the present invention to exlude thermal deformation of the worktable and column, thereby improving the dimensional accuracy of the job.

It is a still further object of the present invention to reduce waste of power and thus to simplify the hydraulic equipment involved and reduce the size thereof, cut down the manufacturing cost of the entire machine and make its operation more economical.

These and other objects are achieved in a vertical multiple-spindle machine comprising a rotary worktable which mounts hydraulic clamping devices and is installed, by provision of a centre hole, on a taper portion of a stationary column. Said worktable has ducts for fluid medium to be force-fed to the clamping devices by way of a circular groove provided on the surface of the taper portion of the column and connected to the source of fluid medium. According to the invention, provided in the column of the machine are interconnected passages arranged to communicate with the source of fluid medium. The outlet from each passage is located on the surface of the taper portion of the column in such a manner that when the worktable is in a fixed position each of its fluid ducts connects with one of said passages. The circular groove is formed so that it has portions curved about the outlets from the passages, whereby it is enabled to connect the worktable fluid ducts with the fluid source during the rotation of the worktable.

With this constructional arrangement, when the worktable is in a fixed position fluid is fed into the worktable ducts through the passages provided in the column, whereas during the rotation of the worktable fluid is fed into the worktable ducts through the circular groove, the latter having portions located between the outlets from the column passages.

Said column passages connect the hydraulic clamping devices with the fluid source during the machining of workpieces so that the latter are kept securely clamped during the working process. On the other hand, said circular groove connects the hydraulic clamping devices with the fluid source during the rotation of the worktable from one fixed position to the other, the location of the workpiece in the clamping device remaining unaffected.

The arrangement whereby the column passages communicate direct with the worktable fluid ducts while the worktable is in a fixed position and the provision of the circular groove with portions curved about the outlets from said column passages make it possible to keep said circular groove out of communication with the fluid source while the worktable is in a fixed position.

It will be noted that leakage of the fluid medium takes place mainly by way of the circular groove. Since the period of worktable rotation (during which the circular groove is in communication with the fluid source) is by far shorter than the period during which the worktable is in a fixed position, the constructional arrangement which constitutes the present invention considerably reduces fluid leakage.

The considerable reduction of the fluid leakage rules out sharp pressure drop in the hydraulic clamping devices, thereby ensuring secure clamping of the workpiece and precluding the possibility of accidents. The elimination of the thermal deformation of the worktable and column and the provision of the stability of the location of the worktable relative to the column improve the accuracy of the machine and, in turn, ensures high dimensional accuracy of the job. The reduction in fluid consumption entails decrease in power input and reduction in the size of the hydraulic equipment involved.

Now the invention will be described in detail with reference to the accompanying drawings in which.

Figure 1:
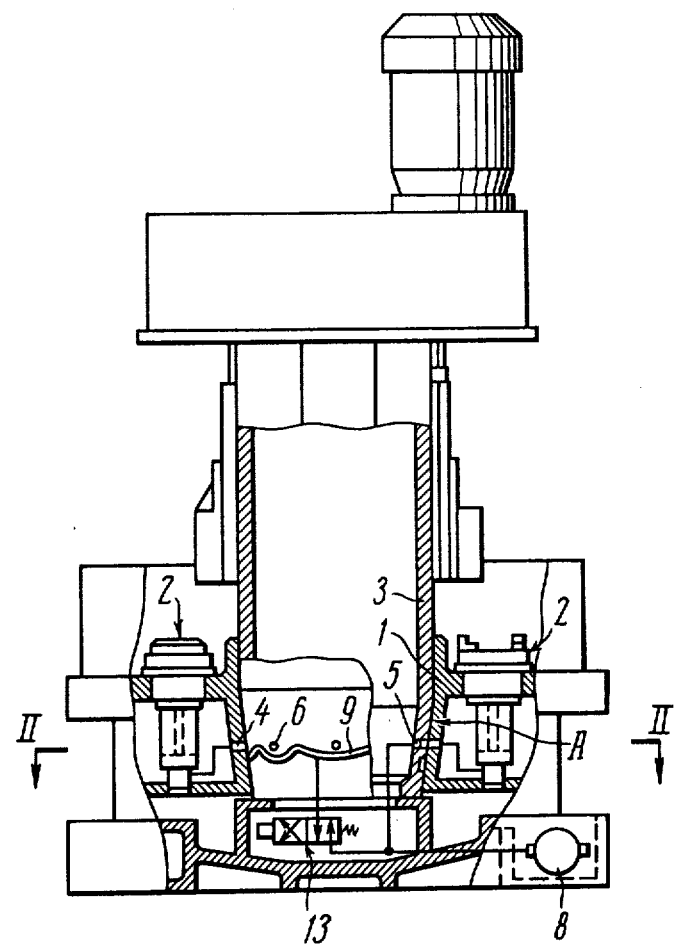
FIG. 1 is a diagrammatic view of the vertical multiple-spindle machine constructed according to the present invention (front view, partially cut away).

A vertical multiple-spindle machine known in the prior art comprises a rotary worktable 1 (FIG. 1) which mounts hydraulic clamping devices 2 for holding workpieces and is installed, by provision of a centre hole, on a taper portion A of a stationary column 3. Provided in said worktable 1 are radial ducts 4 for fluid medium to be force-fed to the hydraulic clamping devices 2. The inlet to the ducts 4 are evenly spaced at the same level round the periphery of the worktable surface mating with the appropriate surface of the taper surface A on the column 3.

Figure 2:
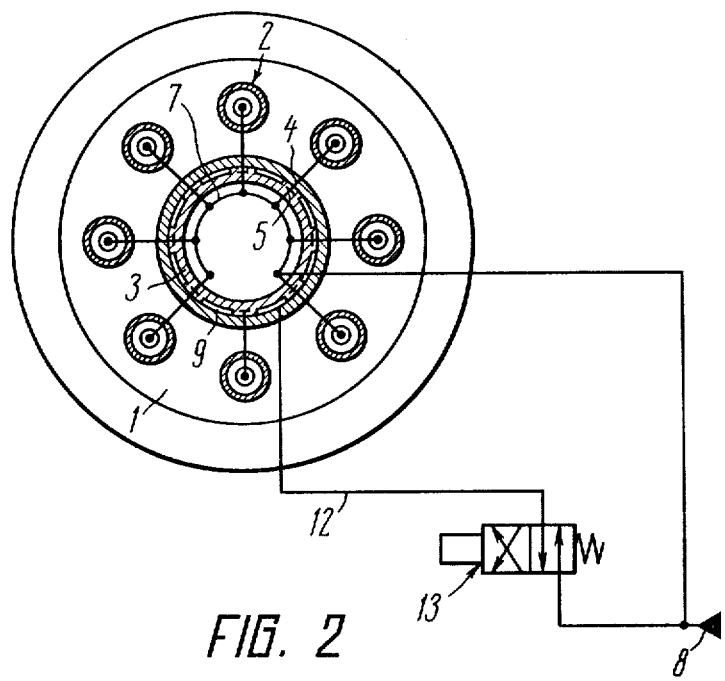
FIG. 2 shows in full lines the disposition of the passages and pipelines.

According to the invention, the column 3 is provided with radial passages 5 (shown in FIG. 2 in full lines). Each passage 5 has an outlet 6 (FIG. 1) on the surface of the column taper portion A. Said outlets 6 are located level with the inlets to the worktable fluid ducts 4 and are situated in such a manner that each of the outlets 6 coincides with the inlet to one of the ducts 4 when worktable 1 is in a fixed position. The passages 5 are interconnected by a fluid line 7 (FIG. 2) provided inside the column 3 and arranged to communicate with a fluid source 8. The fluid medium is fed under pressure and is represented by a full line in FIG. 2.

Figure 3:
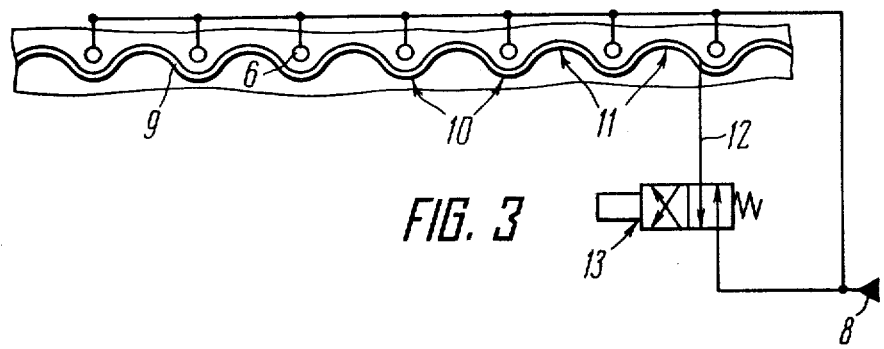
FIG. 3 is a developed view of the taper portion of the stationary column showing the outlets from the passages and the circular groove.

Formed on the taper portion A (FIG. 1) of the column 3 is a circular groove 9 (FIG. 3) which has portions 10 curved about the outlets 6 from the passages 5 and portions 11 located between the outlets 6 and adapted to communicate with the worktable ducts 4 during the rotation of the worktable 1.

Provided in the column 3 is a pipeline 12 which connects the circular groove 9 with the fluid source 8 through a control device 13.

The control device is constructed in the form of a twoposition four-way hydraulic control valve known in the prior art and is kinematically connected with the worktable 1 by any appropriate means known in the art.

During the operation of the machine hydraulic fluid is fed to the clamping devices as follows:

When the worktable (FIG. 1) is in a fixed position, the fluid is delivered under pressure from the fluid source 8 (FIG. 2) through the line 7 into the passages 5 provided in the column 3, the outlets 6 from the passages 5 coinciding with the inlets to the ducts 4 provided in the worktable 1. From the passages 5 fluid is fed through the ducts 4 to the clamping devices 2 which hold the workpieces.

At the beginning of the rotation of the worktable 1 the control device 13 connects the fluid source 8 to the pipeline 12 and the fluid is delivered under pressure via said pipeline 12 to the circular groove 9. Due to the rotation of the worktable 1 the passages 5 become closed by the worktable surface mating with the surface of the column taper portion A. During further rotation of the worktable 1 the ducts 4 become connected with the portions 11 of the circular groove 9 for fluid to go from said portions 11 into said ducts 4.

In this way the stability of the required fluid pressure is maintained in the clamping devices, the workpieces being clamped securely.

At the end of the rotary movement made by the worktable 1 from one fixed position to the other the control device 13 disconnects the pipeline 12 from the fluid source 8, thereby cutting off fluid supply to the circular groove 9. When the worktable 1 reaches the next fixed position each of its ducts 4 coincides with the outlet 6 from one of the passages 5 and now fluid is again fed under pressure through the ducts 4 to the clamping devices 2.

With each subsequent rotation of the worktable from one fixed position to the other the fluid feed cycle is repeated.

Thus fluid is fed to the clamping devices 2 through different paths at different position of the worktable 1, viz. when the worktable 1 is in a fixed position, fluid is fed at a constant pressure through passages 5, whereas during the rotation of the worktable 1 fluid passes through the circular groove 9 wherein it is subjected to pressure only while the worktable is rotating.

What we claim is:

1. A vertical multiple-spindle machine comprising: a rotary worktable provided with a centre hole; hydraulic clamping devices mounted on said worktable; a stationary column having a taper portion on which said worktable is mounted by the use of the centre hole provided therein; a circular groove provided on the taper portion of said column and arranged to communicate with a fluid source; fluid ducts provided in said worktable for fluid to be force-fed to said hydraulic clamping devices via said circular groove; interconnected passaged provided in said column and arranged to communicate with said fluid source, each of said passages having an outlet located on the surface of the taper portion of said column in such a manner that when the worktable is in a fixed position each of its ducts connects with one of the passages; said circular groove has portions curved about said outlets from said passages whereby it connects said worktable fluid ducts with the fluid source during the rotation of said worktable.

* * * * *